United States Patent [19]

Cohen

[11] Patent Number: 5,568,154
[45] Date of Patent: Oct. 22, 1996

[54] SYSTEM AND A METHOD FOR THE INSTANTANEOUS DETERMINATION OF THE FREQUENCIES AND ANGLES OF ARRIVAL OF SIMULTANEOUSLY INCOMING RF SIGNALS

[75] Inventor: Yakov Cohen, Haifa, Israel

[73] Assignee: State of Israel-Ministry of Defense Armament Development Authority-Rafael, Haifa, Israel

[21] Appl. No.: 446,973

[22] Filed: May 22, 1995

[51] Int. Cl.$^6$ ........................................ G01S 5/02
[52] U.S. Cl. .................... 342/443; 342/445; 342/196; 367/125; 324/76.77
[58] Field of Search ................................ 367/125, 128, 367/123; 342/157, 196, 443, 442, 445; 324/76.77

[56] References Cited

U.S. PATENT DOCUMENTS

| 4,333,170 | 6/1982 | Mathews | 367/125 |
| 4,454,597 | 6/1984 | Sullivan | 367/125 |
| 4,480,322 | 10/1984 | Orieux | 367/125 |
| 4,601,025 | 7/1986 | Lea | 367/125 |
| 4,626,859 | 12/1986 | Stansfield | 342/444 |
| 4,639,733 | 1/1987 | King | 342/444 |
| 5,058,419 | 10/1991 | Nordstrom | 367/125 |

OTHER PUBLICATIONS

"Comprehensive Receiver Technology", W. D. Daniels et al Microwave Journal, Apr. 1986.

Primary Examiner—Kenneth A. Wieder
Assistant Examiner—Jose M. Solis
Attorney, Agent, or Firm—Mark M. Friedman

[57] ABSTRACT

A system for the instantaneous determination of the frequencies and angles of arrival of a plurality of simultaneously incoming signals. The system includes beam network matrix for receiving the simultaneously incoming signals, the matrix providing one or more superimposed output signal which includes phase information associated with the angles of arrival of the signals. The system uses a Fourier receiver which includes a sampler means for periodically producing a sample of the superimposed output signals and a frequency differentiator for differentiating the sample by frequency into a train of discrete waveforms. Each of the train of discrete waveforms is associated with one of the incoming signals and includes phase information associated with one of the incoming signals. The Fourier receiver further includes a mechanism for determining frequency which determines from one of the train of discrete waveforms the frequency of one of the incoming signals. The system further includes a mechanism for determining phase which determines from the phase information of one of the train of discrete waveforms the angle of arrival of the incoming signal.

12 Claims, 3 Drawing Sheets

FOUR ELEMENT BUTLER-FED CIRCULAR ARRAY

PHASE RELATIONSHIP AT OUTPUT PORTS $N_n$ DUE TO ANTENNA INPUTS AT $N_n$

| $\Phi$ INPUT DIRECTION | PHASE OUTPUT AT PORT n | | | | |
|---|---|---|---|---|---|
| | N=0 | N=+1 | N=+2 | N=−1 | $\overset{\Delta}{n=+1}$ TO 0 |
| N (0 DEGREES) n=1 | 0 | 0 | 0 | 0 | 0 |
| E (90 DEGREES) n=2 | 0 | 90 | 180 | 270 | 90 |
| S (180 DEGREES) n=3 | 0 | 180 | 0 | 180 | 180 |
| W (270 DEGREES) n=4 | 0 | 270 | 180 | 90 | 270 |

NOT USED (columns N=+2, N=−1)

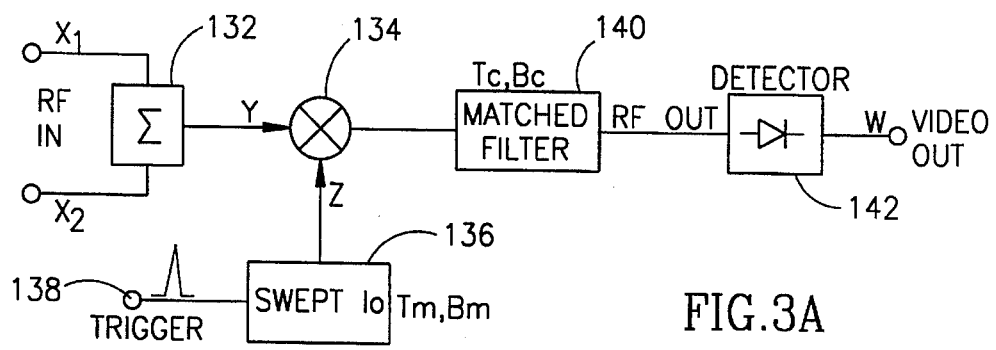
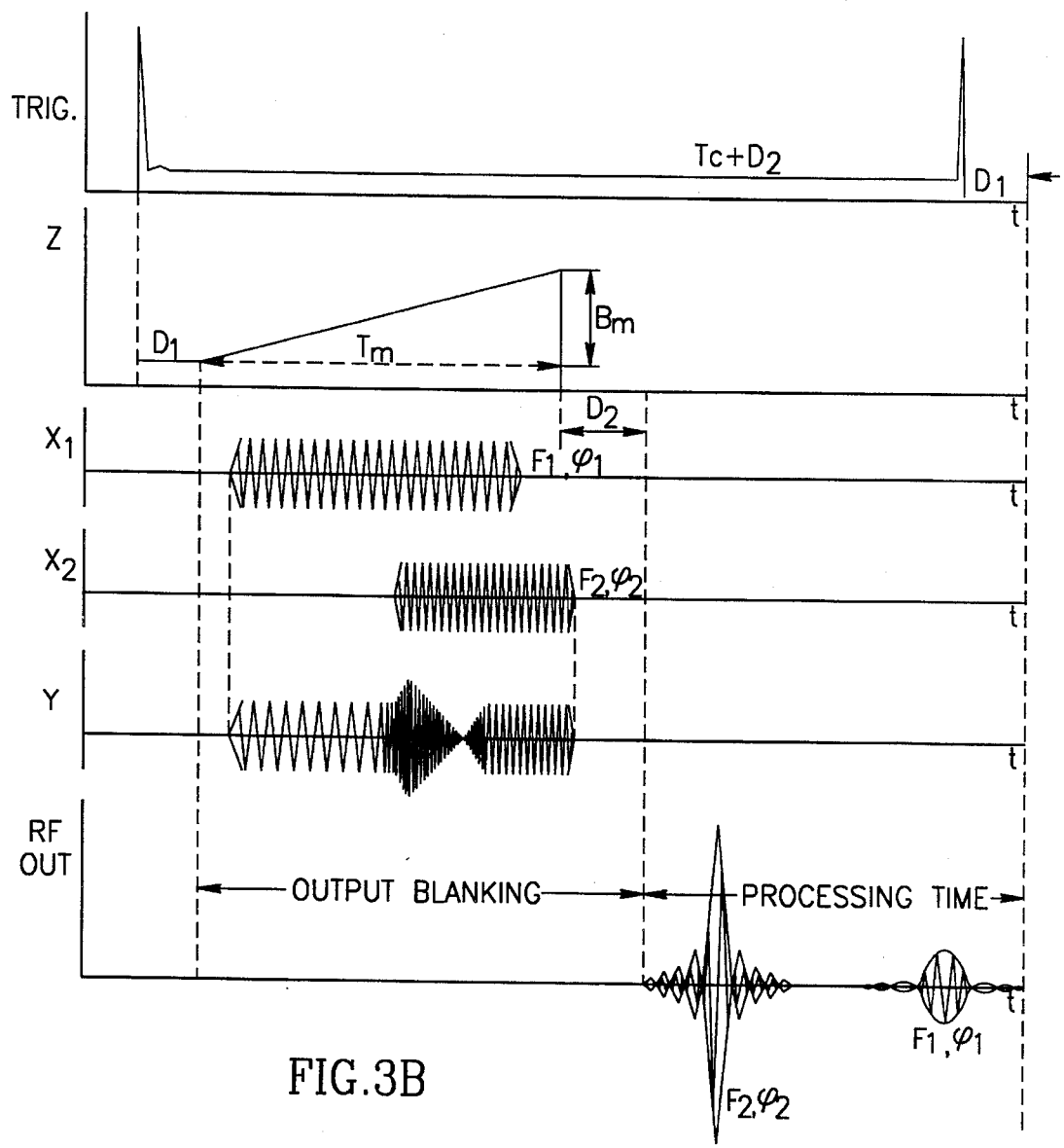
FIG.3A
FIG.3B

SYSTEM AND A METHOD FOR THE INSTANTANEOUS DETERMINATION OF THE FREQUENCIES AND ANGLES OF ARRIVAL OF SIMULTANEOUSLY INCOMING RF SIGNALS

FIELD AND BACKGROUND OF THE INVENTION

The present invention relates to a system and a method for the determination of the frequencies and angles of arrival of simultaneously incoming RF signals in general and in particular to a system and a method for the instantaneous determination of the frequencies and angles of arrival of simultaneously incoming RF signals.

Fourier receivers implementing Fourier transformation analysis are known in the art tier the instantaneous determination of the frequencies of simultaneously incoming RF signals. Known Fourier receivers include channelized receivers, Bragg cell receivers, compressive receivers, frequency scanning receivers, digital FFT receivers and others. Fourier receivers can also be employed to determine the angles of arrival of simultaneously incoming RF signals after taking into consideration the geometry of the antennas receiving the signals. However, the technique requires time consuming and cumbersome mathematical calculations rendering non instantaneous determination of the angles of arrival.

Direction finder systems employing phase interferometry are known in the art for the instantaneous determination of the angles of arrival of simultaneously incoming RF signals. However, no information is available on the frequency of the signals.

There is thus a widely recognized need for, and it would be highly advantageous to have, a system and a method for the instantaneous determination of both the frequencies and the angles of arrival of simultaneously incoming RF signals.

SUMMARY OF THE INVENTION

The main object of the present invention is to provide a system and a method for the instantaneous determination of both the frequencies and the angles of arrival of simultaneously incoming RF signals.

Hence, according to the first aspect of the present invention there is provided a system for the instantaneous determination of the frequencies and angles of arrival of a plurality of simultaneously incoming RF signals, comprising: (a) beam network matrix means receiving the plurality of simultaneously incoming RF signals, the beam network matrix means providing at least one superimposed output signal, the at least one superimposed output signal including phase information associated with the angles of arrival of the plurality of simultaneously incoming RF signals; (b) Fourier receiver means, including (i) sampling means for periodically producing a sample of the at least one superimposed output signal, (ii) frequency differentiating means for differentiating by frequency the sample into a train of discrete waveforms, each of the train of discrete waveforms being associated with one of the plurality of simultaneously incoming RF signals, and each of the train of discrete waveforms including phase information associated with one of the plurality of simultaneously incoming RF signals, (iii) frequency determining means for determining from the one of the train of discrete waveforms the frequency of the one incoming signal of the plurality of simultaneously incoming RF signals; and (c) phase determining means determining from the phase information of the one of the train of discrete waveforms the angle of arrival of the one incoming signal of the plurality of simultaneously incoming RF signals.

According to further features of the present invention, the beam network matrix means is preferably implemented as a Butler matrix.

According to still further features of the present invention, the Fourier receiver means can be any one of the following group: a compressive receiver, a channelized receiver, a Bragg cell receiver and a digital FFT receiver. In a preferred realization of a Fourier receiver, the sampling means includes a swept local oscillator, the frequency differentiating means includes a matched pulse compression filter and the frequency determining means includes a square law detector.

According to still further features of the present invention, the phase determining means includes a digital phase comparator and an ambiguity resolving network.

The system further comprises a multi-element antenna array for receiving the plurality of simultaneously incoming signals, wherein the multi-element antenna array is either a circular array or a planar array.

There is also provided, according to a second aspect of the present invention, a method for the instantaneous determination of the frequencies and angles of arrival of a plurality of simultaneously incoming signals, comprising the steps of: (a) receiving the plurality of simultaneously incoming signals; (b) providing at least one superimposed output signal of the plurality of simultaneously incoming signals, where the at least one superimposed output signal includes phase information associated with the angles of arrival of the plurality of simultaneously incoming signals; (c) sampling the at least one superimposed output signal for periodically producing a sample of the at least one superimposed output signals, (d) frequency differentiating the sample into a train of discrete wave,irons, each of the train of discrete waveforms being associated with one of the plurality of simultaneously incoming signals, and each of the train of discrete waveforms including phase information associated with one of the plurality of simultaneously incoming signals, (e) determining from one of the train of discrete waveforms the frequency of one incoming signal of the plurality of simultaneously incoming signals; and (f) determining from the phase information of one of the train of discrete waveforms the angle of arrival of the one incoming signal of the plurality of simultaneously incoming signals.

BRIEF DESCRIPTION OF THE DRAWINGS

The invention is herein described, by way of example only, with reference to the accompanying drawings, wherein:

FIG. 3a shows a schematic representation of a compressive receiver implemented in the system of FIG. 1; and FIG. 3b shows graphs illustrating the manner in which the compressive receiver of FIG. 3a differentiates by frequency an output signal of two superimposed incoming RF signals having different frequencies into discrete waveforms.

DESCRIPTION OF THE PREFERRED EMBODIMENTS

The present invention is of a system for the instantaneous determination of the frequencies and angles of arrival of simultaneously incoming RF signals.

The principles and operation of the system according to the present invention may be better understood with reference to the drawings and the accompanying description.

Figure 1:
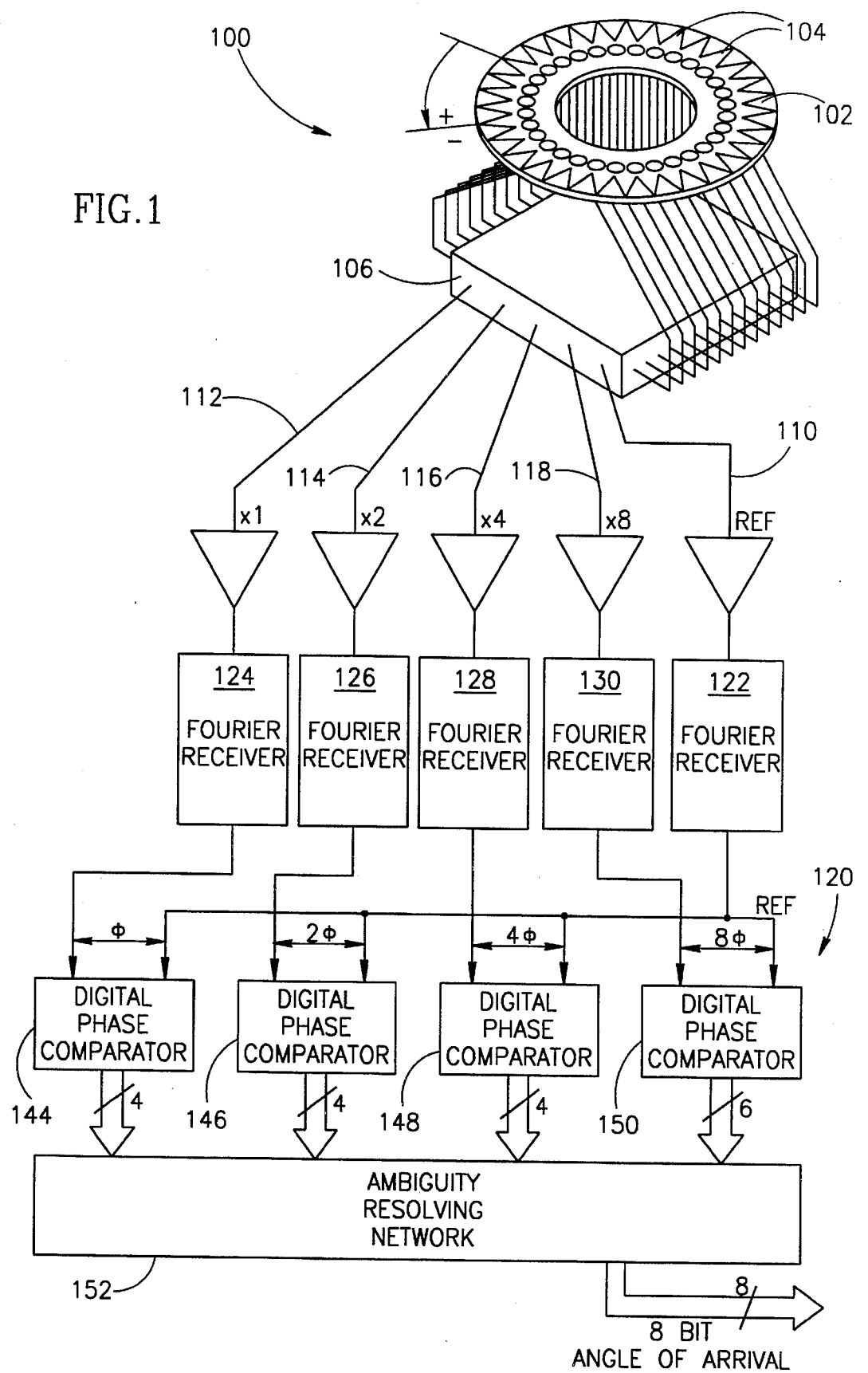
FIG. 1 shows a schematic representation of a preferred embodiment of a system for the instantaneous determination of the frequencies and angles of arrival of simultaneously incoming RF signals constructed and operative according to the present invention.

With reference now to FIG. 1, there is shown a schematic illustration of a preferred embodiment of a system for the instantaneous determination of the frequencies and the angles of arrival of simultaneously incoming RF signals, generally designated 100, constructed and operative in accordance with the teachings of the present invention.

System 100 includes an antenna array 102 for receiving incoming signals where antenna array 102 is preferably in the form of a symmetrical multi-element circular or planar array providing 360° coverage. Antenna array 102 can provide coverage of less than 360° depending on the intended application of system 100. The resolution of antenna array 102 is dependent on the number of elements 104 as known in the art.

Figure 2:
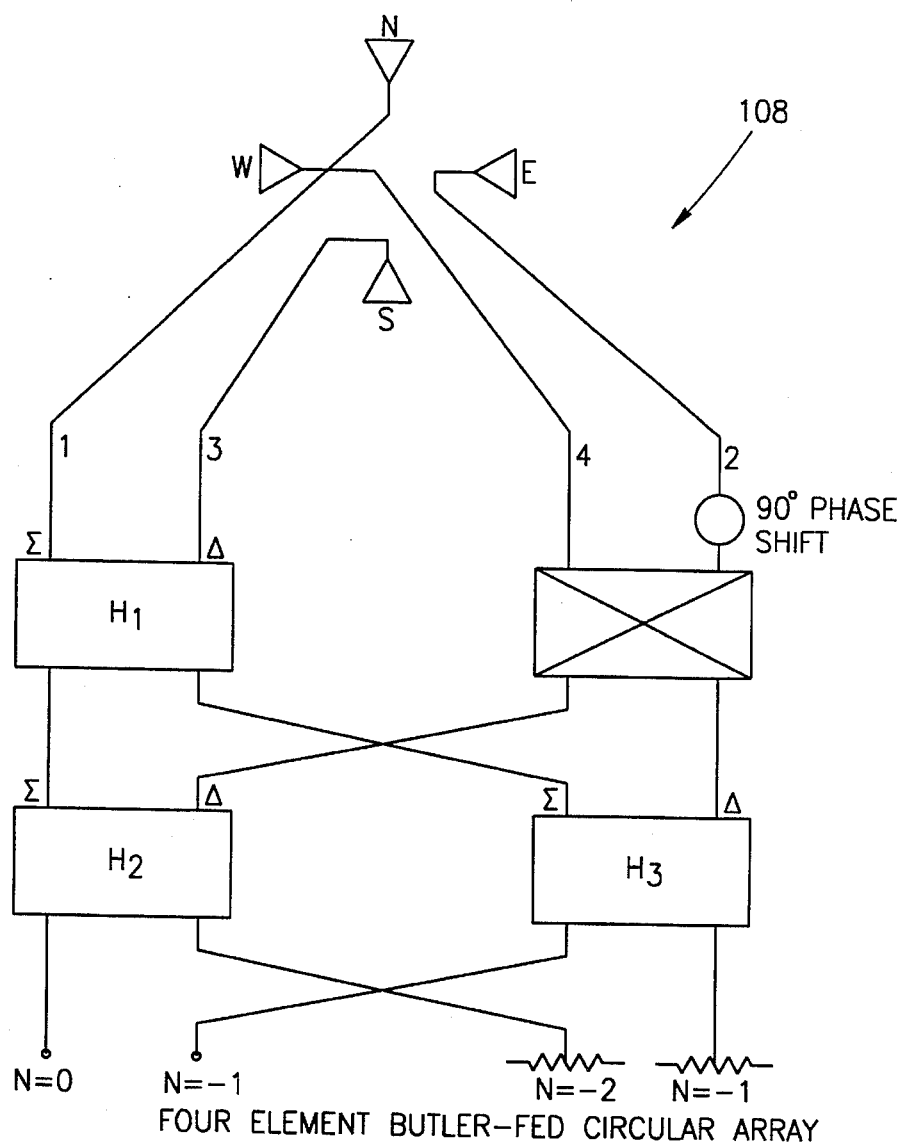
FIG. 2 shows a schematic representation of a four-element Butler-fed circular array which is representative of the beam network matrix of the system of FIG. 1.

Antenna array 102 feeds the simultaneously incoming RF signals to a beam network matrix 106 for processing to provide output signals including phase information associated with their angles of arrival. An example of a well known implementation of a beam network matrix is a Butler matrix 108 (see FIG. 2) which, in the case of a single incoming signal, provides phase information as shown in the Table entitled Phase Relationships at Output Ports $N_n$ due to Antenna Inputs at $n_n$.

In the preferred embodiment of system 100, beam network matrix 106 is provided with the following output channels: a $mode_0$ channel 110 denoted as REF channel, a $mode_1$ channel 112 denoted as ×1 channel, a $mode_2$ channel 114 denoted as ×2 channel, a $mode_4$ channel 116 denoted as ×4 channel and a $mode_8$ channel 118 denoted as ×8 channel. Hence, in this instance, a single incoming signal received by antenna array 102, having a mechanical angle of arrival $\phi$, generates an output signal $\sin(\theta_i+\phi_{REF})$ along REF channel 110 independent of its angle of arrival $\phi$, an output signal $\sin(\phi_i+\phi_{REF}+\phi)$ along channel 112, an output signal $\sin(\phi_i+\phi_{REF}+2\phi)$ along channel 114, an output signal $\sin(\phi_i+\phi_{REF}+4\phi)$ along channel 116 and an output signal $\sin(\phi_i+\phi_{REF}+8\phi)$ along channel 118. For example, assuming that the angle of arrival $\phi$ of an incoming signal equals $3\pi/4$ and $\phi_{REF}$ equals $\pi/8$, then the phase of the output signal along ×1 channel 112 equals $7\pi/8$, the phase of the output signal along ×2 channel 114 equals $5\pi/8$, the phase of the output signal along ×4 channel 116 equals $5\pi/8$ and the phase of the output signal along ×8 channel 118 equals $\pi/8$. For the sake of clarity, it should be noted at that ×2, ×4 and ×8 multiples of the phase of the output signal along ×1 channel 112 are provided for increasing the accuracy of the determination of the angles of arrival as known in the art.

In view of the above, it can be appreciated that the phase information indicative of the absolute or "mechanical" angle of arrival $\phi$ of a single incoming RF signal can be derived by phase subtraction of the phase along REF channel 110 from the phases along channels 112–118 as implemented in an array of digital phase comparators, generally designated 120. However, the output signals provided by Butler matrix 106 along channels 110–118 are superimpositions of more than one incoming RF signal due to the simultaneous arrival of more than one incoming RF signal at antenna array 102. Therefore, the output signals from Butler matrix 106 are required to be first packaged into trains of discrete waveforms in which each discrete waveform includes the phase information of a single incoming RF signal before phase subtraction of the phase along REF channel 110 from channels 112–118 can be performed.

The packaging of the superimposed output signals along channels 110–118 into trains of discrete waveforms is achieved by an array of Fourier receivers including five Fourier receivers 122–130 connected to REF, ×1, ×2, ×4, and ×8 channels, 110–118 respectively. Fourier receivers 122–130 are required to fulfill two requirements. First, that each of Fourier receivers 122–130 packages the superimposed output signals from channels 110–118 into identical trains of discrete waveforms. Second, that the discrete waveforms as issued by each of Fourier receivers 122–130 for each incoming RF signal retain the phase information associated with the angles of arrival as provided by beam network matrix 106.

Suitable implementations of Fourier receivers include channelized receivers, Bragg cell receivers, compressive receivers, frequency scanning receivers, digital FFT receivers and the like. In the preferred architecture of system 100, Fourier receivers 122–130 are preferably compressive receivers described more fully in the article entitled "Compressive Receiver Technology" by Daniels et al. in the Microwave Journal, April 1986, pgs. 175–185, which is incorporated by reference as if fully set forth herein.

For the purposes of exposition, the use of a compressive receiver to determine the frequencies of two simultaneously incoming RF signals $x_1$ and $x_2$ having different carrier frequencies $f_1$ and $f_2$ and different phase information $\phi_1$ and $\phi_2$ due to different angles of arrival is now described with reference to FIG. 3. For the sake of clarity, RF signals $x_1$ and $x_2$ are shown summed by a summation device 132 into a superimposed signal output y representative of the superimposed output signals from beam network matrix 106. Hence, superimposed output signal y is a function of the frequencies and the phases due to the angles of arrival of incoming RF signals $x_1$ and $x_2$.

A mixer 134 convolutes superimposed signal output y with a "chirped" sawtooth waveform signal z provided by a swept local oscillator 136 periodically activated by a master trigger 138. The convoluted signal from mixer 134 is fed into a matched pulse compression filter 140 for producing samples of superimposed output signal y within different bandwidths. Within each bandwidth, matched pulse compression filter 140 differentiates by frequency the sample of superimposed output signal y into a train of discrete waveforms having $\sin(x)/x$ envelopes where each discrete waveform is associated with one incoming RF signal.

Hence, in this case, the train of discrete signals includes two discrete waveforms in which the first discrete waveform is associated with incoming RF signals $x_1$ and the second discrete waveform is associated with incoming RF signal $x_2$. In general, lower frequency incoming RF signals are differentiated by matched pulse compression filter 140 before higher frequency incoming RF signals. The frequencies $f_1$ and $f_2$ of RF input signals $x_1$ and $x_2$ are determined by a square law detector 142.

In addition to enabling the determination of the frequencies $f_1$ and $f_2$, of the discrete waveforms include other information in terms of their amplitude and length which are dependent on the relative strengths and times of arrival of the incoming RF signals. However, more importantly, the phase information provided by beam network matrix 106 is retained as phase $\phi_1$ within the first discrete waveform and phase $\phi_2$ within the second discrete waveform.

Extending this analysis to Fourier receivers 122–130, Fourier receivers 122–130 issue identical trains of discrete waveforms notwithstanding that, for each incoming RF signal, the phase embodied within each of the discrete waveforms from Fourier receivers 122–130 is different. In other words, the five discrete waveforms as issued by Fourier receivers 122–130 relating to one incoming RF signal retain the phase information provided by beam network matrix 106, thereby enabling the phase subtraction of the phase along REF channel 110 from the phases along channels 112–118.

The time required by Fourier receivers 110–118 to determine the frequencies of simultaneously incoming RF signals is dependent on the width of each bandwidth, the rise time of their swept local oscillators and the integration time of their matched pulse compression filters. Typically, the time for determining the frequencies of RF signals within a single 1 GHz bandwidth is in the order of $1 \times 10^{-6}$ secs.

With reference back to FIG. 1, after determination of the frequencies of the simultaneously incoming RF signals, the discrete waveforms are fed to array of digital phase comparators 120 including a φ digital phase comparator 144 connected between pair of Fourier receivers 122 and 124, a 2φ digital phase comparator 146 connected between pair of Fourier receivers 122 and 126, a 4φ digital phase comparator 148 connected between pair of Fourier receivers 122 and 128 and a 8φ digital phase comparator 150 connected between pair of Fourier receivers 122 and 130. By virtue of Fourier receivers 122–130 packaging the superimposed output signals along channels 110–118 into identical trains of discrete waveforms embodying the phase information provided by beam network matrix 106, the following processing takes place for each incoming RF signal: digital phase comparator 144 digitizes the difference between the phases embodied within the discrete waveforms outputted from REF channel 110 and ×1 channel 112, digital phase comparator 146 digitizes the difference between the phases embodied within the discrete waveforms outputted from REF channel 110 and ×2 channel 114, digital phase comparator 148 digitizes the difference between the phases embodied within the discrete waveforms outputted from REF channel 110 and ×4 channel 116 while digital phase comparator 150 digitizes the difference between the phases embodied within the discrete waveforms outputted from REF channel 110 and ×8 channel 118. Following the above example, digital phase comparator 144 digitizes the mechanical angle of arrival φ of $3\pi/4$, digital phase comparator 146 digitizes the phase difference of $\pi/2$, digital phase comparator 148 digitizes the phase difference of $\pi$ while digital phase comparator 150 digitizes the phase difference of 0.

The output from digital phase comparators 144–150 is input to an ambiguity resolving network 152 for analysis to determine the arrival angles of each of the incoming RF signals in turn as fed by Fourier receivers 122–130. Ambiguity resolving network 152 preferably employs the 8φ phase difference to obtain a more accurate determination of the absolute or mechanical angle φ. As the name implies, ambiguity resolving network 152 requires the φ, 2φ and 4φ phase differences in the case of ambiguities. The output of ambiguity resolving network 152 is preferably an n bit output signal requiring less than $1 \times 10^{-6}$ secs. of computation time to determine the angle of arrival of each incoming RF signal.

While the invention has been described with respect to a limited number of embodiments, it will be appreciated that many variations, modifications and other applications of the invention may be made.

What is claimed is:

1. A system for the instantaneous determination of the frequencies and angles of arrival of a plurality of simultaneously incoming signals, comprising:
   (a) beam network matrix means receiving the plurality of simultaneously incoming signals, said beam network matrix means providing at least one superimposed output signal, said at least one superimposed output signal including phase information associated with the angles of arrival of the plurality of simultaneously incoming signals;
   (b) Fourier receiver means, including:
      (i) sampling means for periodically producing a sample of said at least one superimposed output signals,
      (ii) frequency differentiating means for differentiating by frequency said sample into a train of discrete waveforms, each of said train of discrete waveforms being associated with one of the plurality of simultaneously incoming signals, and each of said train of discrete waveforms including phase information associated with one of the plurality of simultaneously incoming signals,
      (iii) frequency determining means for determining from said one of said train of discrete waveforms the frequency of said one incoming signal of the plurality of simultaneously incoming signals; and
   (c) phase determining means for determining from said phase information of said one of said train of discrete waveforms the angle of arrival of said one incoming signal of the plurality of simultaneously incoming signals.

2. The system as in claim 1, wherein said beam network matrix means includes a Butler matrix.

3. The system as in claim 1, wherein said Fourier receiver means can be any one of the following group: a compressive receiver, a channelized receiver, a Bragg cell receiver and a digital FFT receiver.

4. The system as in claim 1, wherein said sampling means includes a swept local oscillator.

5. The system as in claim 1, wherein said frequency differentiating means includes a matched pulse compression filter.

6. The system as in claim 1, wherein said frequency determining means includes a square law detector.

7. The system as in claim 1, wherein said phase determining means includes a digital phase comparator.

8. The system as in claim 1, wherein said phase determining means includes an ambiguity resolving network.

9. The system as in claim 1, further comprising a multi-element antenna array for receiving the plurality of simultaneously incoming signals.

10. The system as in claim 9, wherein said multi-element antenna array is a circular array.

11. The system as in claim 9, wherein said multi-element antenna array is a planar array.

12. A method for the instantaneous determination of the frequencies and angles of arrival of a plurality of simultaneously incoming signals, comprising the steps of:
   (a) receiving the plurality of simultaneously incoming signals;
   (b) providing at least one superimposed output signal of the plurality of simultaneously incoming signals, where the at least one superimposed output signal includes phase information associated with the angles of arrival of the plurality of simultaneously incoming signals;
   (c) sampling the at least one superimposed output signal for periodically producing a sample of the at least one superimposed output signals, (d) frequency differentiating the sample into a train of discrete waveforms, each of the train of discrete waveforms being associated with one of the plurality of simultaneously incoming signals, and each of the train of discrete waveforms including phase information associated with one of the plurality of simultaneously incoming signals, (e) determining from one of the train of discrete waveforms the frequency of one incoming signal of the plurality of simultaneously incoming signals; and (f) determining from the phase information of one of the train of discrete waveforms the angle of arrival of the one incoming signal of the plurality of simultaneously incoming signals.

* * * * *